US006814537B2

(12) United States Patent
Olsen

(10) Patent No.: US 6,814,537 B2
(45) Date of Patent: Nov. 9, 2004

(54) INTERCHANGEABLE POWER TURBINE CARTRIDGE ASSEMBLY

(75) Inventor: Andrew J. Olsen, Amesbury, MA (US)

(73) Assignee: Ingersoll-Rand Energy Systems Corporation, Portsmouth, NH (US)

(*) Notice: Subject to any disclaimer, the term of this patent is extended or adjusted under 35 U.S.C. 154(b) by 122 days.

(21) Appl. No.: 10/253,219

(22) Filed: Sep. 24, 2002

(65) Prior Publication Data

US 2003/0059295 A1 Mar. 27, 2003

Related U.S. Application Data

(60) Provisional application No. 60/325,081, filed on Sep. 26, 2001.

(51) Int. Cl.[7] ............................................. F01D 25/08
(52) U.S. Cl. ........................ 415/111; 415/175; 415/229
(58) Field of Search ................................ 415/111, 112, 415/122.1, 170.1, 175, 177, 178, 229

(56) References Cited

U.S. PATENT DOCUMENTS 5,288,153 A * 2/1994 Gardner ...................... 384/311

6,250,897 B1   6/2001  Thompson et al.
6,307,278 B1  10/2001  Nims et al.

\* cited by examiner

Primary Examiner—Edward K. Look
Assistant Examiner—Dwayne White
(74) Attorney, Agent, or Firm—Michael Best & Friedrich

(57) ABSTRACT

The invention recites a power turbine assembly including a turbine rotor and a plurality of turbine blades mounted to said rotor and adapted to rotate said rotor in response to a flow of hot gas over said blades. A support structure having a journal bearing and at least one other bearing supports said rotor for rotation, said journal bearing having a proximal end and a distal end with respect to said turbine blades. A supply of lubricant communicates with said journal bearing to provide lubricant between said rotor and an inner surface of said journal bearing, said lubricant damping rotational frequencies of said rotor and creating a temperature gradient from greater than about 1000° F. at said blades to less than about 350° F. at said distal end.

53 Claims, 15 Drawing Sheets

INTERCHANGEABLE POWER TURBINE CARTRIDGE ASSEMBLY

RELATED APPLICATION DATA

This application claims benefit under 35 U.S.C. Section 119(e) of U.S. Provisional Application No. 60/325,081 filed Sep. 26, 2001.

BACKGROUND OF THE INVENTION

The present invention relates to combustion turbine engines, and particularly to combustion turbine engines employing two turbines. More particularly, the present invention relates to a modular power turbine driving a rotating device.

Combustion turbine engines are compact prime movers that are easily adapted to drive many different devices (e.g., generators, pumps, compressors, etc.). To operate most efficiently, the turbine of the combustion turbine engine rotates at a high rotational speed relative to most mechanical devices operable by the turbine. For example, a synchronous generator typically rotates at 3600 RPM or 1800 RPM to generate 60 Hz electricity. If 50 Hz is desired, the generator must rotate at 3000 RPM or 1500 RPM. Other turbine-engines use a high-speed generator that produces a high-frequency output. Additional equipment, namely a rectifier and an inverter, then convert the electricity to a more useable form. Furthermore, screw pumps, as well as other mechanical devices, often operate at a speed between the speed of a synchronous generator and the power turbine. To drive these devices requires a gearbox or a turbine that efficiently operates at the lower speed. Each device driven by a turbine requires a turbine design or gearbox design that accommodates the desired operating speed of the driven component.

The high-operating speed of the turbine requires that it be dynamically stable at all operating speeds and under all load conditions. Small imbalances, loads, or vibration can be detrimental to the operation of the turbine.

SUMMARY OF THE PREFERRED EMBODIMENTS

According to the present invention a power turbine assembly includes a turbine rotor and a plurality of turbine blades mounted to the rotor and adapted to rotate the rotor in response to a flow of hot gas over the blades. The assembly also includes a support structure having a journal bearing and at least one other bearing supporting the rotor for rotation. The journal bearing has a proximal end and a distal end with respect to the turbine blades. A supply of lubricant communicates with the journal bearing to provide lubricant between the rotor and an inner surface of the journal bearing, the lubricant damps rotational frequencies of the rotor and creates a temperature gradient from greater than about 1000° F. at the blades to less than about 350° F. at the distal end.

The invention also provides a power turbine assembly including a high-speed turbine rotor having a turbine end and a plurality of turbine blades mounted to the turbine end of the rotor and adapted to rotate the rotor in response to a flow of hot gas over said blades. The assembly also includes a sleeve connected to the rotor, a journal bearing supporting the turbine end of the rotor, and a supply of lubricant communicating with the journal bearing. The assembly provides lubricant between the rotor and the journal bearing, the lubricant substantially damps the vibration of the turbine rotor.

In another embodiment, the invention provides a structure for supporting a combustion turbine rotor for rotation above about 25,000 RPM, and to support the rotor for thrust. The structure includes a sleeve having a drive gear connected to the turbine rotor and a housing defining a first support, a second support, and a lubrication flow path. The lubrication flow path receives a flow of lubricant from an inlet and distributes the flow of lubricant to the first support, the second support, and the drive gear. A journal bearing is connected to the first support to support a first end of the turbine rotor for rotation and a second bearing is connected to the second support to support a second end of the turbine rotor for rotation and to support the thrust load of the rotor.

In yet another embodiment, the invention provides a speed reducing cartridge for interfacing between a high-speed rotating turbine rotor and a lower speed rotating element. The cartridge includes a power turbine cartridge having a journal bearing and a second bearing axially aligned with the journal bearing. The bearings support the turbine rotor for rotation about a first axis. The power turbine cartridge is supported by the speed reducing cartridge. A drive gear is connected to the turbine rotor and a driven gear is connected to the lower speed rotating element. A driven component housing supports the lower speed rotating element for rotation about a second axis. The driven component housing is supported by the speed reducing cartridge such that the drive gear and driven gear engage one another with a backlash. An adjusting assembly interconnects the power turbine cartridge and the speed-reducing cartridge and is movable to adjust the backlash between the drive gear and the driven gear.

The invention further provides a method of controlling heat flow between a high-temperature region and a precision aligned region of a high-speed rotating shaft. The method includes the acts of providing a housing having a journal bearing support and supporting the high-speed shaft for rotation using the journal bearing such that the high-temperature region is adjacent the journal bearing. The method also includes the acts of introducing a flow of lubricant to the journal bearing to provide lubrication between the bearing and the shaft and to provide cooling to the bearing and the shaft and maintaining the precision aligned region of the high-speed rotating shaft below 350° F.

In yet another construction, the invention provides a method of supporting and aligning a high-speed turbine rotor having a drive gear with a lower speed rotor having a driven gear such that the high-speed turbine rotor is able to drive the lower speed rotor. The method includes the acts of providing a speed reducing cartridge and supporting the high-speed turbine rotor within a housing for rotation about a first axis, the housing including a journal bearing and a non-journal bearing supporting the turbine rotor for rotation. The method also includes the acts of supporting the lower speed rotor within the speed reducing cartridge such that the lower speed rotor is rotatable about a second axis and interconnecting the housing and the speed reducing cartridge with an adjusting member such that the first axis is offset a distance from the second axis. In addition, the method includes the acts of engaging the drive gear and the driven gear such that a backlash between the gears is present and adjusting the adjusting member to change the distance between the first axis and the second axis to achieve a desired backlash.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
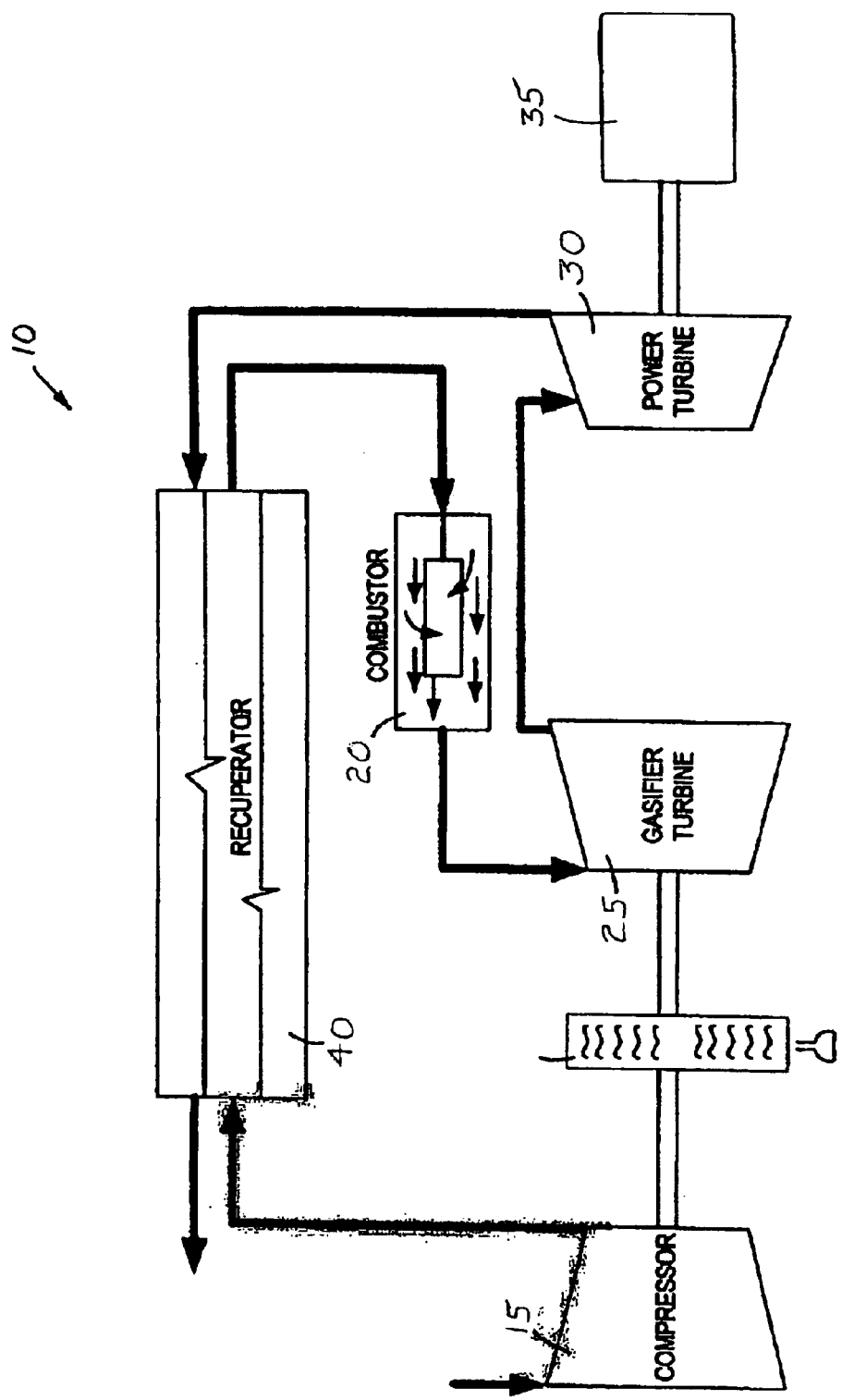
FIG. 1 is a schematic representation of a combustion turbine engine having a separate gasifier turbine and power turbine.

As shown schematically in FIG. 1, a turbine or microturbine engine 10 includes a compressor 15, a combustor 20, a gasifier turbine 25, a power turbine 30, a generator 35, and a recuperator or heat exchanger 40. The gasifier turbine 25, power turbine 30, generator 35, and compressor 15 each include rotary elements. The rotary elements are either directly or indirectly coupled to one another so that rotation of the gasifier turbine rotary element produces a corresponding rotation of the compressor rotary element and rotation of the power turbine rotary element produces a corresponding rotation of the generator rotary element. Alternatively, a single turbine can be used in place of the gasifier turbine 25 and power turbine 30.

While a generator 35 has been illustrated and described as being driven by the gasifier turbine 25, a person having ordinary skill in the art will realize that the engine 10 is capable of driving virtually any piece of rotating equipment. For example, turbine engines of the type described herein are commonly used to drive pumps, compressors, generators, conveyors, etc. or any combination thereof. Therefore, the present invention should not be limited to systems that operate to drive generators alone.

Rotation of the compressor rotary element draws atmospheric air into the compressor 15 so that the compressor 15 may pressurize the air. The compressor 15 discharges the pressurized (compressed) air to the cool flow path of the recuperator 40 for preheating.

The preheated compressed air exits the recuperator 40 and enters the combustor 20 where it mixes with a fuel (e.g., propane, kerosene, natural gas, gasoline, diesel, etc.). Alternatively, the fuel may be mixed with the air at the compressor 15 intake. The fuel-air mixture is ignited and combusted within the combustor 20 to produce a hot flow of products of combustion. The products of combustion flow through the gasifer turbine 25, transfer thermal and kinetic energy to the gasifier turbine 25, and induce rotation of the rotary elements of the gasifier turbine 25 and compressor 15. The gasifier turbine 25 thus supplies the rotary energy needed to drive the compressor 15.

The gas exits the gasifier turbine 25 and enters the power turbine 30. Again, the gas transfers thermal and kinetic energy to the power turbine 30, thereby inducing rotation of the power turbine rotary element and the generator rotary element.

The power turbine exhaust gas, which is still quite hot, enters the hot gas flow path of the recuperator 40 where it preheats the compressed air in the recuperator 40 to raise the efficiency of the combustor 20. After exiting the recuperator 40, the exhaust gas is vented to the atmosphere or is further processed or used for cogeneration of hot water or some other useful purpose.

The above-described engine 10 is one of many for which the present invention is applicable. For example, the present invention will also function with a non-recuperated turbine engine. Therefore, the invention should not be limited to the engine just described.

Figure 2:
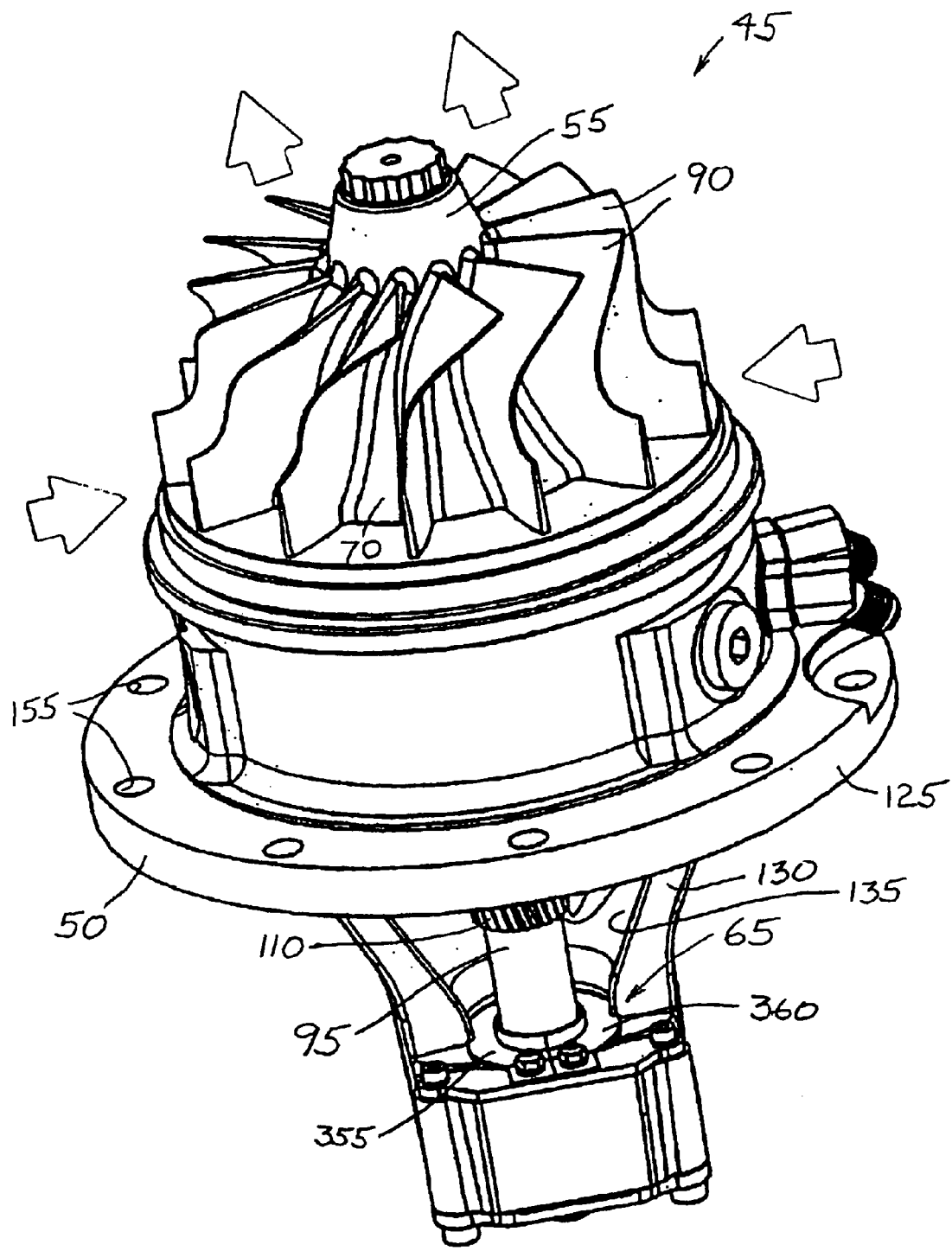
FIG. 2 is a perspective view of a power turbine cartridge embodying the invention.

Turning to FIG. 2, a power turbine cartridge 45 of the invention is illustrated. The power turbine cartridge 45 includes a housing 50, a turbine rotor 55, a first bearing assembly 60 (shown in FIG. 4), and a second bearing assembly 65 (best illustrated in FIG. 5). A scroll case (not shown) covers the top portion of the turbine rotor 55 and guides the flow of hot gasses radially into the turbine rotor 55 and axially out of the power turbine 45 as indicated by the arrows.

Figure 3:
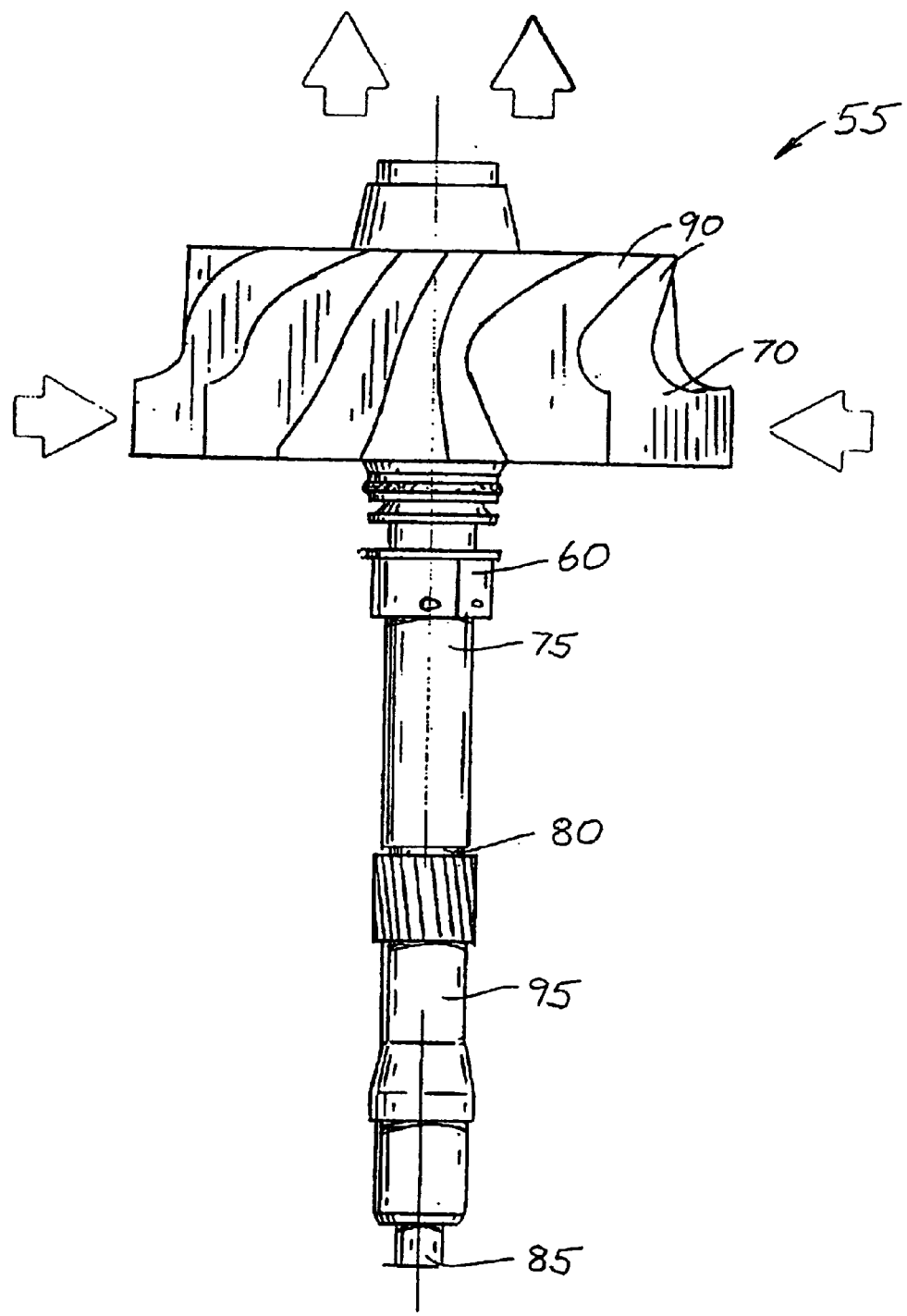
FIG. 3 is a front view of the turbine rotor assembly of the power turbine cartridge of FIG. 2.

As is best illustrated in FIG. 3, the power turbine rotor 55 includes a bladed portion 70, a first bearing portion 75, a sleeve surface 80, and a threaded end 85. The bladed portion 70 includes a plurality of blades 90 formed and spaced to receive the flow of hot gasses in a substantially radial direction near the bottom of the bladed portion 70. The blades 90 redirect the flow and absorb thermal and kinetic energy, eventually discharging the flow axially along the center of the turbine rotor 55 as indicated by the arrows. Thus, the blades 90 facilitate the transfer of energy (thermal and kinetic) from the hot gas flow to the turbine rotor 55. As such, the blades 90 and the bladed portion 70 of the turbine rotor 55 become quite hot. Typically, the blades 90 will be exposed to a flow of gas having a temperature in excess of 1000° F. With some cycles providing gas at a temperature of 1400° F. or hotter.

The first bearing portion 75 of the turbine rotor 55 includes a cylindrical surface sized to ride within the first bearing assembly 60. The first bearing assembly 60 will be described in detail below.

The sleeve surface 80 is disposed between the first bearing portion 75 and the threaded end 85. The sleeve surface 80 is sized to receive a sleeve 95. The sleeve 95 (shown exploded in FIG. 4) includes an internal bore 100 sized to engage the sleeve surface 80 to firmly locate the sleeve 95 in a coaxial position with the turbine rotor 55. In preferred constructions, the sleeve 95 is press-fit onto the sleeve surface 80, however other attachment methods are possible (e.g., shrink-fit, pinned attachment, welding, soldering, brazing, etc.). In some constructions, the sleeve 95 is integrally formed with the turbine shaft 55.

A nut 105 (illustrated in FIG. 5) threads onto the threaded end 85 of the turbine rotor 55 and locks the axial position of the sleeve 95. Thus, the nut 105, sleeve 90, and turbine rotor 55 cooperate to define a composite shaft having a stiffness that is higher than the stiffness of the turbine rotor 55 alone. By increasing the stiffness, the composite shaft is able to operate at any speed (frequency) within its desired speed range without exceeding the first bending mode natural frequency of the composite shaft. As a person having skill in the art will realize, the first bending mode may or may not be the first mode natural frequency. For example, many shaft systems may have a cylindrical mode (the centerline of the shaft orbiting the centerline of the bearings) and a rocking mode (endpoint of the rotor orbiting the bearing centerline) below the first bending mode. By using bearings having high damping (such as a journal bearing) shafts are able to accelerate through the first two modes without causing significant damage.

The sleeve 95 includes a drive gear 110 and a second bearing surface 115. The second bearing surface 115 of the sleeve 95 extends from a shoulder 120 to the end of the sleeve 95 opposite the gear 110. The drive gear 110 a separate piece that attaches to the sleeve 95 but is preferably formed as part of the sleeve 95. Many different attachment methods can be used to attach the gear 110 to the sleeve 95 if they are not formed as a single component (e.g., press-fit, shrink fit, screws, pins, welding, soldering, brazing, etc.).

While many gears 110 are commercially available, the high rotational speed of the turbine rotor 55 (in excess of 25,000 RPM) requires that the gear 110 be very precise. Therefore, preferred constructions use as the drive gear 110 a helical gear that meets or exceeds the requirements of a class 12 gear as defined by the American Gear Manufactures Association (AGMA).

The housing 50, best illustrated in FIGS. 2, and 4–12, includes a flange 125, an outer wall 130 defining a cavity 135, a window 140 open to the cavity 135, a first bearing support 145, and a second bearing support 150. The flange 125 is circular and includes a plurality of holes 155 sized to accommodate bolts. The bolts facilitate attachment of the power turbine cartridge 45 to a speed-reducing cartridge 160 as is described below with regard to FIG. 16.

The cavity 135 is an open region of the housing 50 disposed substantially between the first and second bearing supports 145, 150 in which the turbine rotor 55 rotates. The window portion 140 provides an opening that allows access to the turbine rotor 55 and engagement of the drive gear 110 with a driven gear 165.

Figure 4:
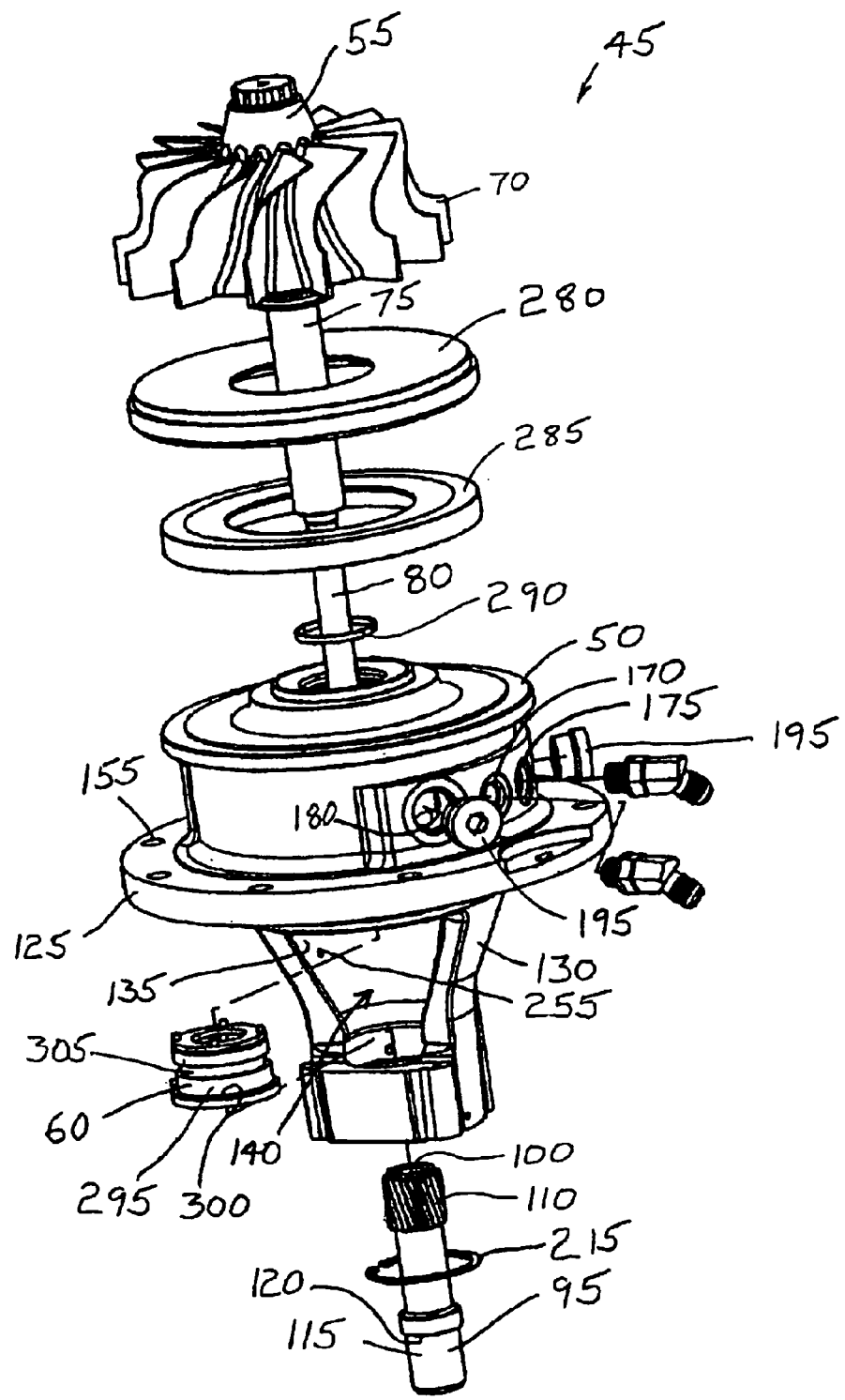
FIG. 4 is a partially exploded perspective view of the power turbine cartridge of FIG. 2.
Figure 5:
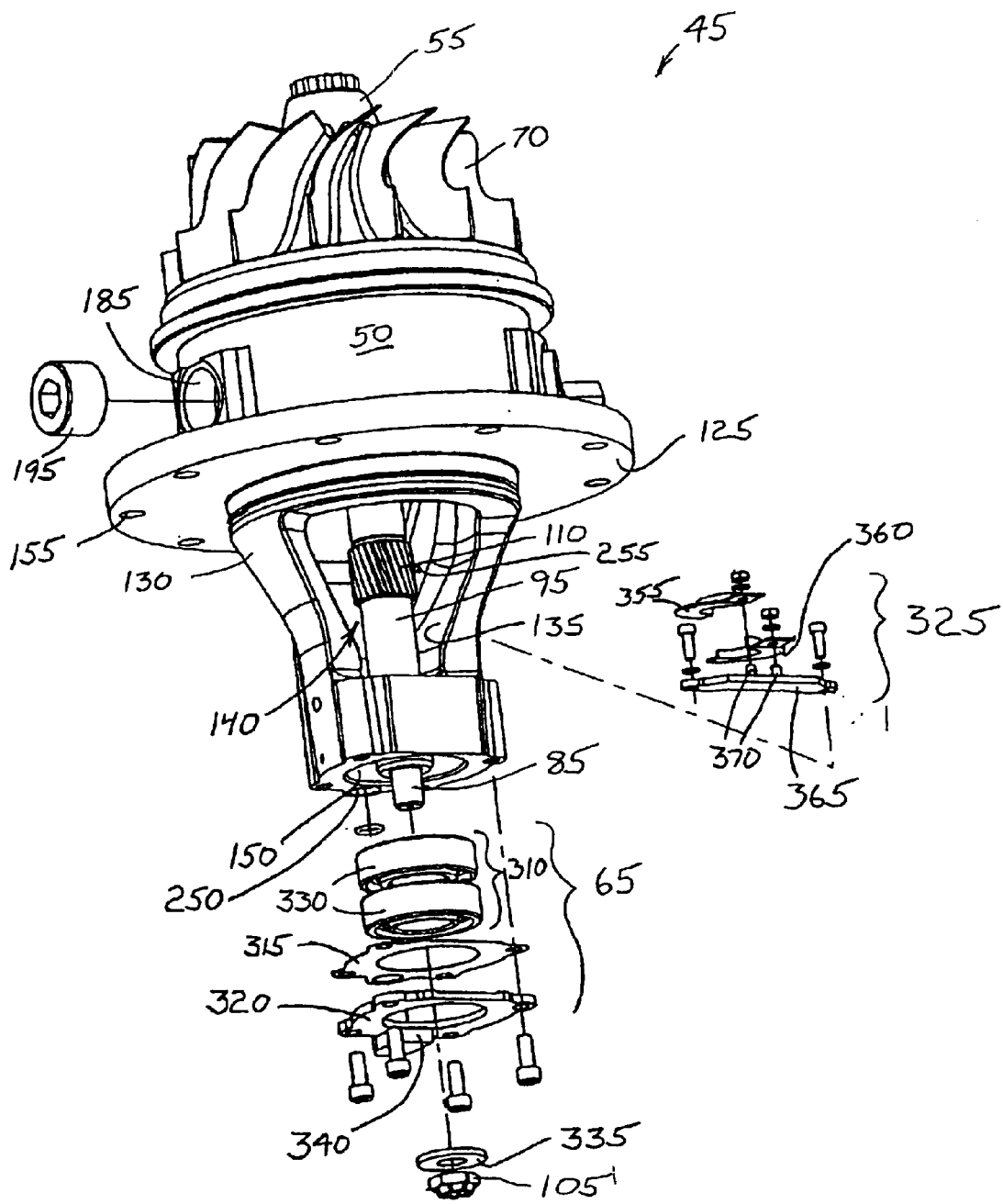
FIG. 5 is a partially exploded perspective view of the power turbine cartridge of FIG. 2.
Figure 6:
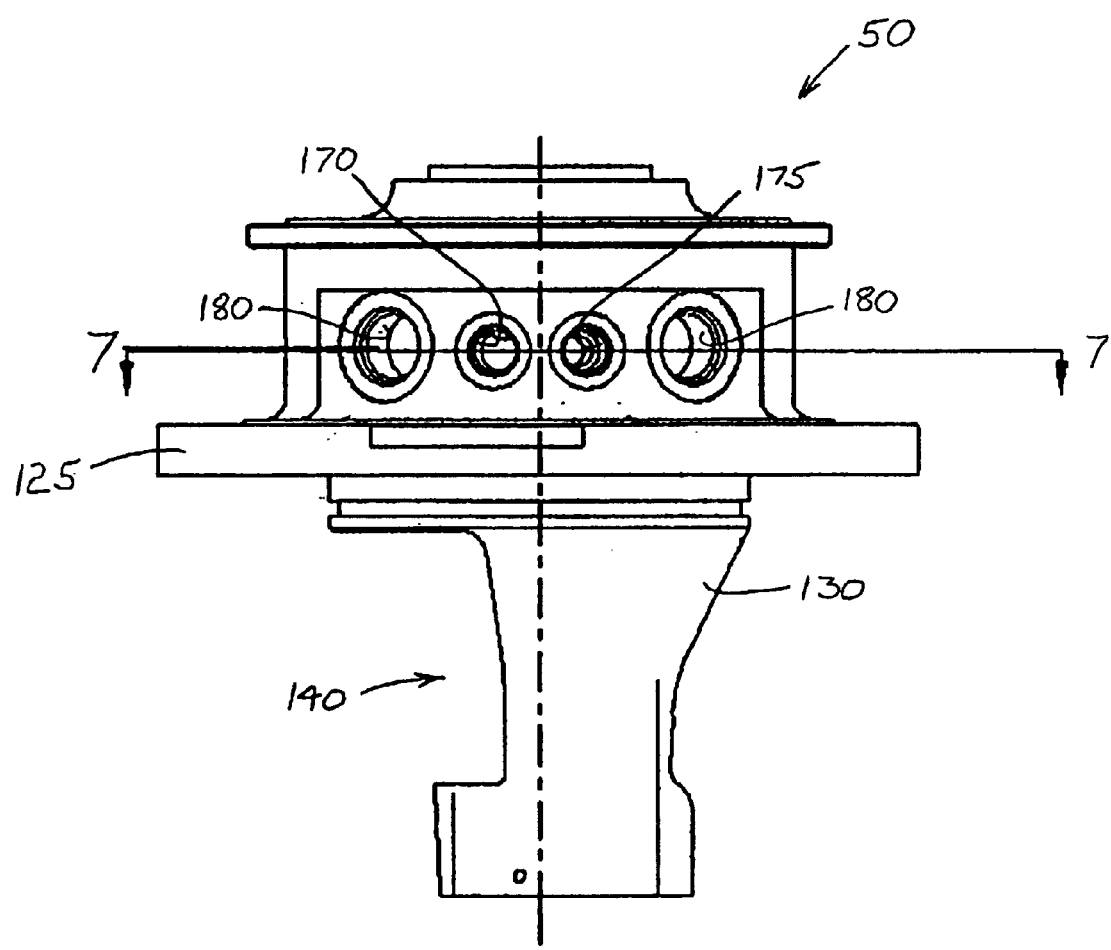
FIG. 6 is a front view of the housing of the power turbine cartridge of FIG. 2.
Figure 9:
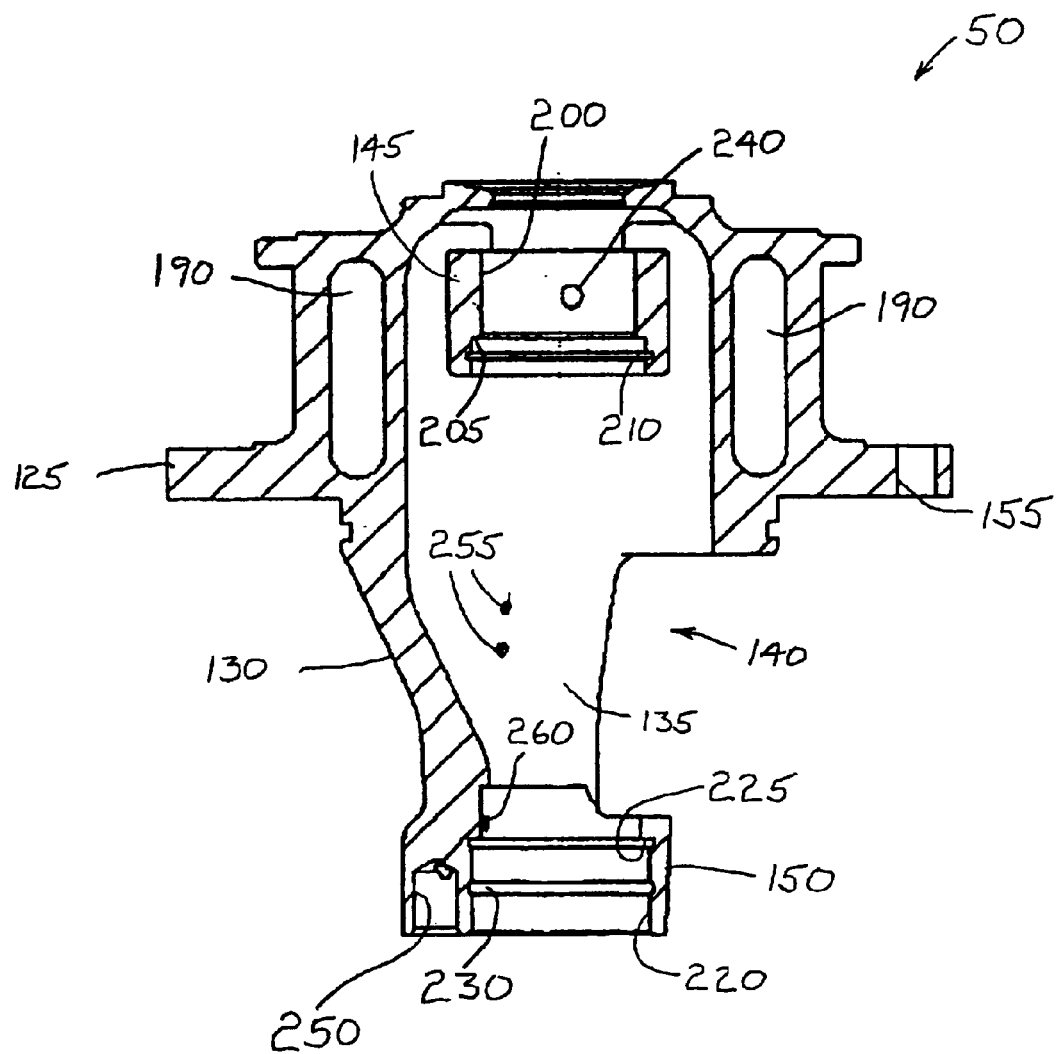
FIG. 9 is a cross-sectional view of the housing of FIG. 6, taken along line 9—9 of FIG. 7.

Turning to FIG. 4, the housing 50 includes first and second lubricant inlets 170, 175, two water inlets 180, and a water outlet 185 (shown in FIG. 5). The water inlets 180 provide a connection for a cooling water supply. The cooling water, if used, flows into a water jacket 190 defined within the housing 50 (best illustrated in FIGS. 7 and 9). The water flows out of the water jacket 190 through the water outlet 185. The water jacket 190 provides additional cooling for the portion of the housing 50 adjacent the hot bladed portion 70 of the turbine rotor 55. As shown in FIG. 9 the water jacket 190 is sized and positioned such that the wall thickness of the housing 50 remains substantially constant throughout, thereby reducing the potential thermal stress. Plugs 195 inserted into the water inlets 180 and water outlet 185, as illustrated in FIGS. 4 and 5, close and seal the water jacket 190 for constructions that do not use the water jacket 190.

While the water jacket 190 has been described as using water, many other fluids can be used as a coolant. For example, compressed air from the compressor 15 could pass through the water jacket 190 to provide cooling and to receive additional preheat.

The first bearing support 145 extends into the center of the housing 50 in a cantilever fashion and provides a location for the first bearing 75. As shown in FIG. 9, the first bearing support 145 includes a cylindrical bore 200 sized to receive the first bearing 60 and a shoulder 205 that positions the bearing 60 axially. A snap-ring groove 210 is also provided to allow a snap-ring 215 to lock the bearing 60 at the desired axial location.

The second bearing support 150 includes a cylindrical bore 220 and a shoulder 225 that positions the top of the second bearing 65 in the desired location. A circumferential groove 230 is positioned approximately near the center of the cylindrical bore 220. The groove's function will be described below.

Figure 7:
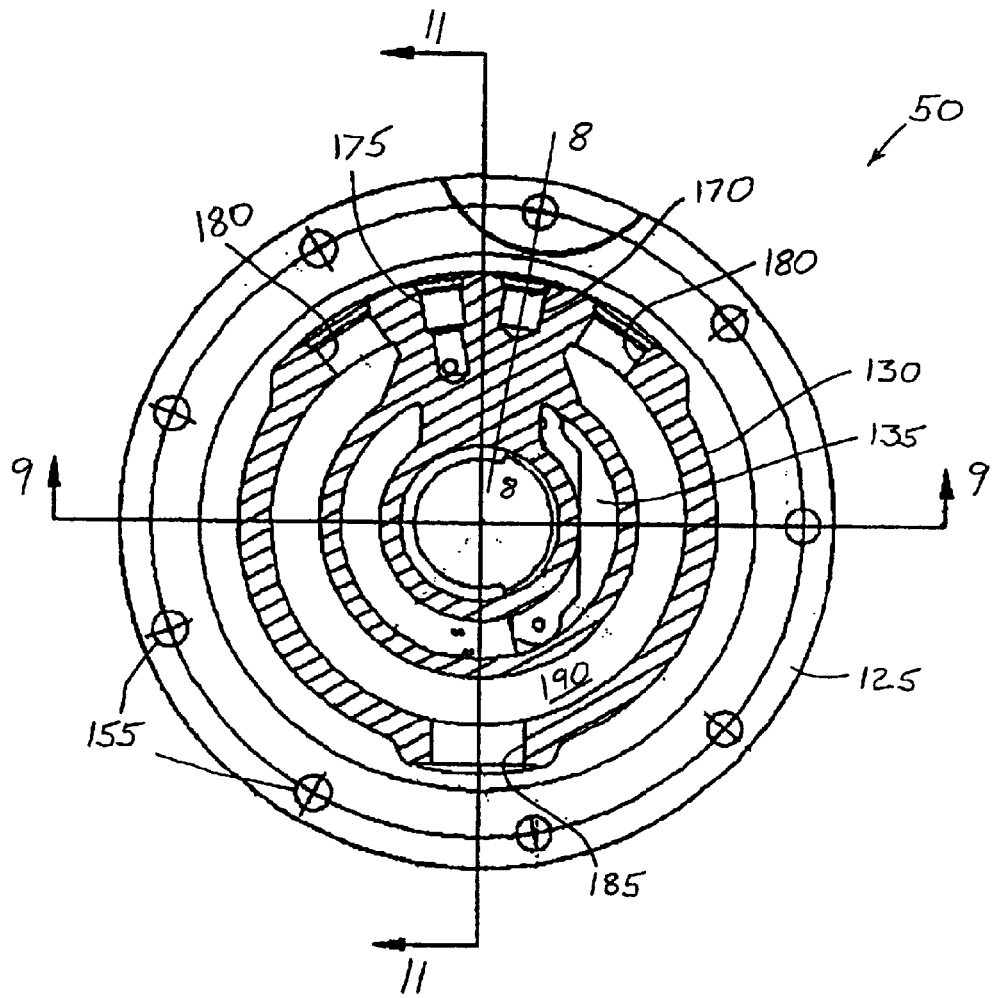
FIG. 7 is a cross-sectional view of the housing of FIG. 6, taken along line 7—7 of FIG. 6.
Figure 8:
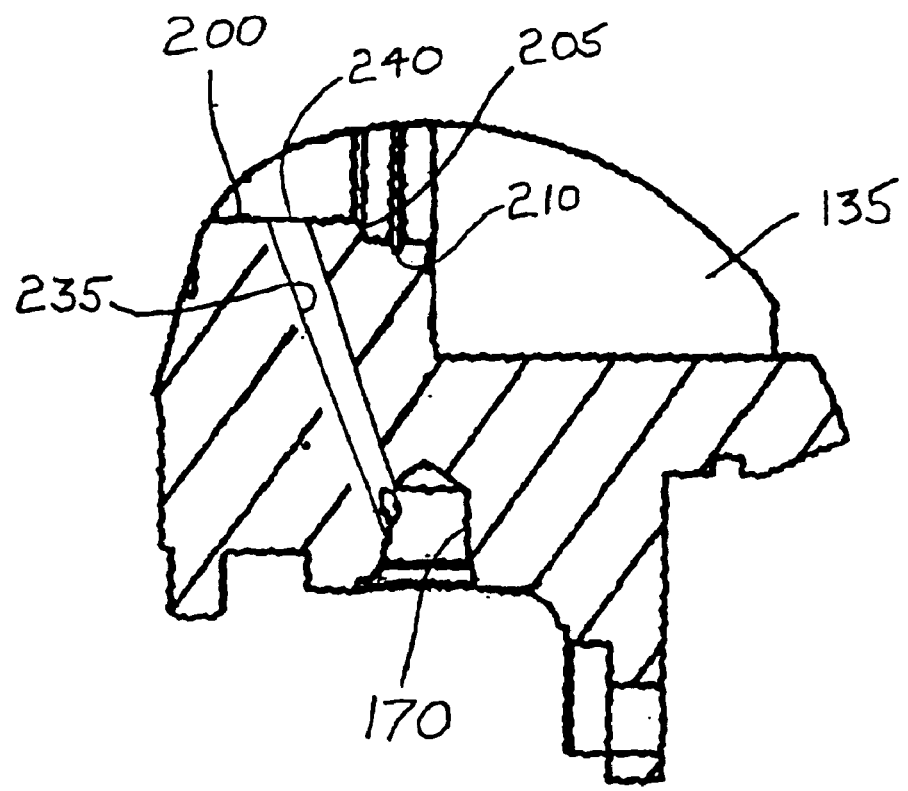
FIG. 8 is an enlarged sectional view of a portion of the housing of FIG. 6, taken along line 8—8 of FIG. 7.

The bearing supports 145, 150 and drive gear 110 require a flow of lubricant in order for the power turbine cartridge 45 to operate properly. As shown in FIG. 7, the first lubricant inlet 170 is in fluid communication with the first bearing support 145. Lubricant, typically oil, enters through the inlet 170 and flows through a passage 235 (shown in FIG. 8) that is cast, drilled, or otherwise formed within the housing 50. The passage 235 guides the lubricant to the first bearing support 145. The lubricant enters the bearing support 145 through an opening 240 best illustrated in FIG. 9. As the oil is used by the first bearing 60, it drains into the cavity 135 within the housing 50 and eventually out of the power turbine cartridge 45.

Figure 10:
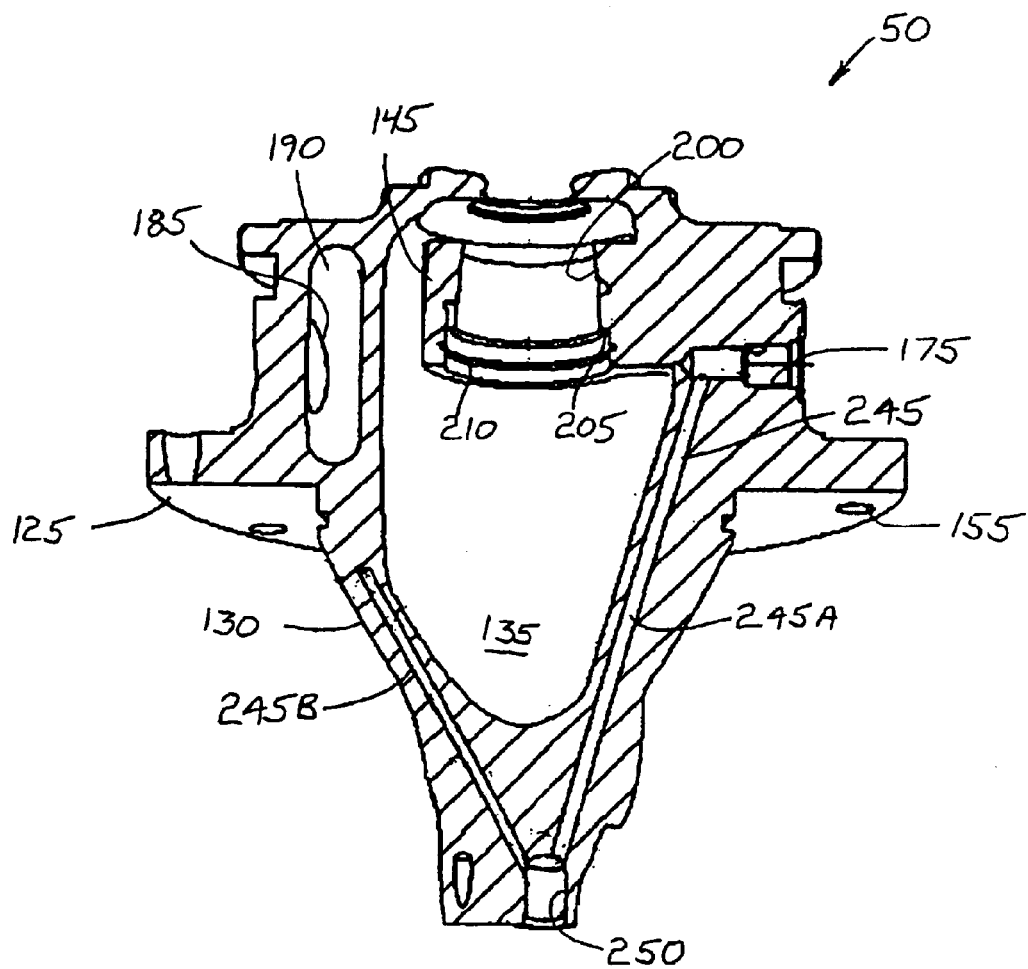
FIG. 10 is a cross-sectional view of the housing of FIG. 6, taken along the plane defined by the oil passages.
Figure 11:
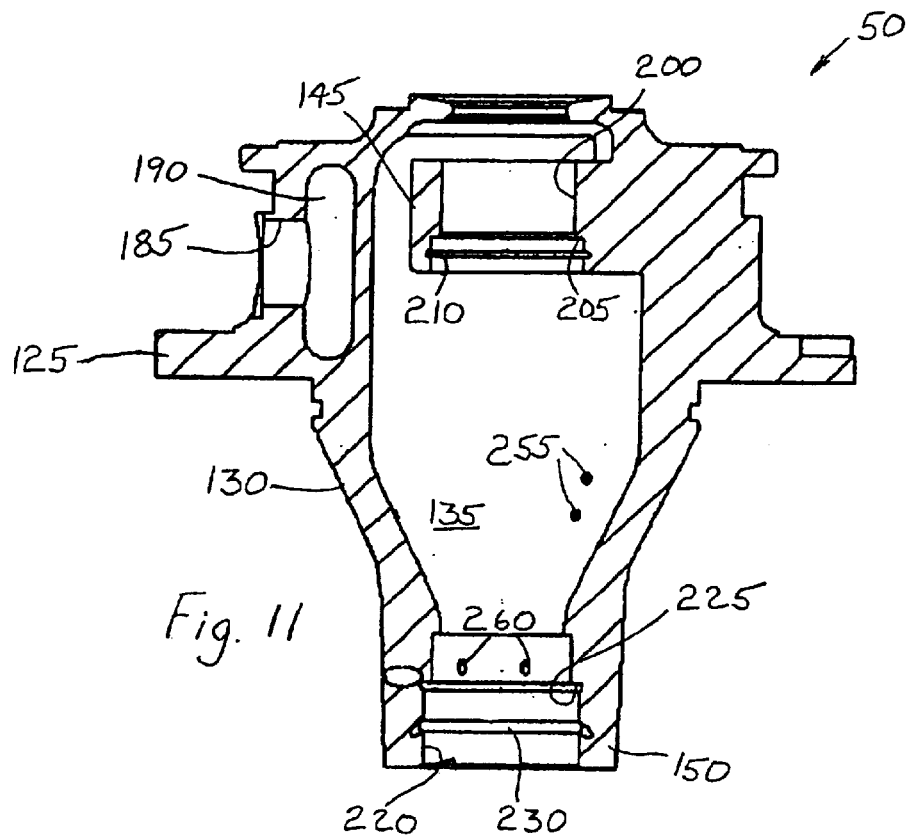
FIG. 11 is a cross-sectional view of the housing of FIG. 6, taken along line 11—11 of FIG. 7.
Figure 12:
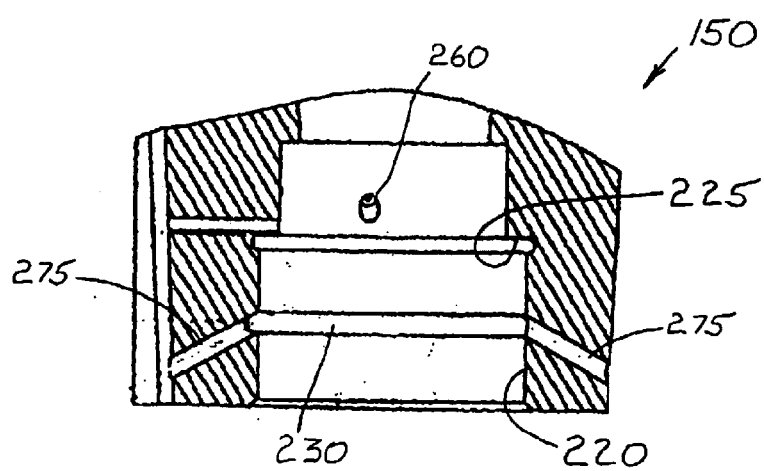
FIG. 12 is an enlarged view of the second bearing support of FIG. 11.

The second lubricant inlet 175, also shown in FIG. 7, provides fluid to the drive gear 110 and to the second bearing 65 disposed in the second bearing support 150. Again, a passage or a plurality of passages 245 are cast, drilled, or otherwise formed in the housing 50 to guide the fluid from the inlet 175 to the gear 110 and the bearing 65. FIG. 10 is a sectional view of the housing taken through the plane defined by the passages 245 and illustrates how the lubricant passes from the second oil inlet 175 to the second bearing support 150. The oil flows within a downwardly extending passage 245A to a lower oil reservoir 250 where it is directed to one of a plurality of locations. The lower oil reservoir 250 directs lubricating oil to drive gear jets 255 (shown in FIGS. 9 and 11), upper second bearing jets 260 (shown in FIG. 12), and to lower second bearing jets 265 (shown in FIGS. 14 and 15).

A gear passage 245B extends up to the gear jet 255 or plurality of gear jets where oil is admitted into the cavity 135. The gear jets 255 (visible in FIGS. 4 and 5) are aligned to spray oil directly onto the drive gear 110 during operation. Another construction includes a second gear jet or plurality of gear jets fed from the downwardly extending passage 245A before the oil reaches the lower oil reservoir 250.

Jets as used herein can be as simple as a small hole sized to act like a nozzle to spray oil to the desired location. Other constructions use preformed nozzles that attach (e.g., thread) to the housing 50 and function as jets.

Oil within the lower reservoir 250 also flows to the upper second bearing jets 260 along the passage 245B. These jets 260 (shown in FIGS. 9, 11–12, and 15), or in some constructions a single jet, are aligned to spray oil onto the top portion of the second bearing 65. Again, as with the drive gear oil supply, oil can be routed from the downwardly extending passage 245A to the upper second bearing jet 260 before it enters the lower reservoir 250.

To facilitate drainage from the second bearing 65, oil is removed via the groove 230 disposed in the cylindrical bore 220 of the second bearing support 150. The oil exits through passages 275 (shown in FIG. 12) and drains out of the power turbine cartridge 45.

The remaining oil is supplied to the lower portion of the second bearing 65 in a manner that will be described below. Thus, the second bearing 65 is fully lubricated using only a single oil inlet 175 into the housing. After the oil is used, it drains out the bottom of the power turbine cartridge 45 or flows out the window portion 140 of the housing 50.

FIG. 4 illustrates the assembly of the turbine rotor 55 into the housing 50. A backplate 280 and insulating plate 285 provide some thermal separation between the bladed portion 70 of the turbine rotor 55 and the housing 50. A piston ring 290 provides a seal between the turbine rotor 55 and the housing 50 to reduce or prevent hot gas flow from passing into the housing. Thus, the hot gas is substantially isolated from the housing 50. The first bearing assembly 60 slides onto the first bearing portion 75 of the turbine rotor 55 and is supported within the housing 50 at the first bearing support 145. The snap-ring 215 locks the first bearing 60 in the proper axial position.

Figure 13:
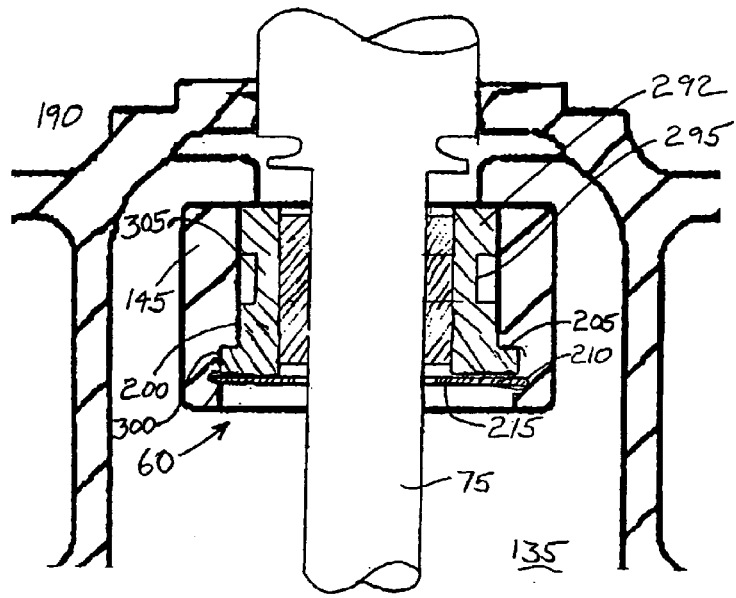
FIG. 13 is an enlarged sectional view of the first bearing of the housing of FIG. 6.

FIG. 13 better illustrates the first bearing 60 installed in the housing 50. The first bearing 60 includes a tilting pad journal bearing 292. While a tilting pad journal bearing is preferred, other journal bearings also can be used with the invention. For example, a two-piece offset halfjournal bearing could be used in place of the tilting pad journal bearing.

Titling pad bearings provide damping for the turbine rotor 55, along with an additional tolerance for shaft misalignment and superior stability during rotation. The damping and additional stability provided by the tilting pad bearing 292 allow the turbine rotor 55 to operate at a rotational frequency that is always below the first bending mode frequency of the rotor 55.

In addition, tilting pad bearings are well suited to receiving a high volume of oil for cooling. This allows the bearing 292 to act as a thermal barrier, thereby reducing the temperature of the turbine rotor 55 above and below the bearing 292. In many constructions, the top portion of the turbine rotor 55 will operate at a temperature of at least about 1000° F. or hotter. However, it is desirable that the lower portion of the turbine rotor 55 remain cool to improve the dynamic stability of the turbine rotor 55 at high speed and to prevent rapid degradation of the oil. The use of the journal bearing 292 allows for a high flow of oil across the bearing 292 for cooling purposes. In preferred constructions, the portion of the turbine rotor 55 just above the journal bearing 292 is maintained at or below 350° F. with more preferred constructions maintaining the temperature below 150° F.

The bearing 292 includes four rocker-pivot tilting pads that support the turbine rotor 55 for rotation. A bearing casing 295 includes a shoulder 300 and an outer groove 305 that directs oil from the housing inlet 240 to the bearing oil inlets that surround the bearing casing 295 near its axial center. The oil is free to escape from the ends of the bearing 292 where it collects within the cavity 135 and escapes from the power turbine cartridge 45 through the window 140.

FIG. 13 illustrates one possible installation of the journal bearing 292 in which the shoulder 300 of the casing 295 prevents movement of the journal bearing 292 toward the bladed portion 70 of the turbine rotor 55 and a snap-ring 215 prevents the journal bearing 292 from moving in the opposite direction. In another construction, illustrated in FIG. 15, the journal bearing casing 295A does not include a shoulder. Instead, two snap-rings 215A retain the journal bearing 292A in the desired location.

A bolt, screw, pin or other mechanism engages the housing 50 and the bearing casing 295, 295A to prevent rotation of the casing 295, 295A within the housing 50 during turbine operation.

Many different journal bearings 292 are possible and contemplated by the invention. For example, bearings with more or less pads and spherical tilting pad bearings could be employed. Furthermore, cylindrical, elliptical, or other shaped bores could be employed in the bearing.

FIG. 5 shows an exploded view of the second bearing 65 better illustrating its construction and attachment to the turbine rotor 55 and housing 50. The second bearing 65 includes a duplex bearing 310, a spring member 315, a bearing retainer 320, and an oil shield assembly 325.

Figure 14:
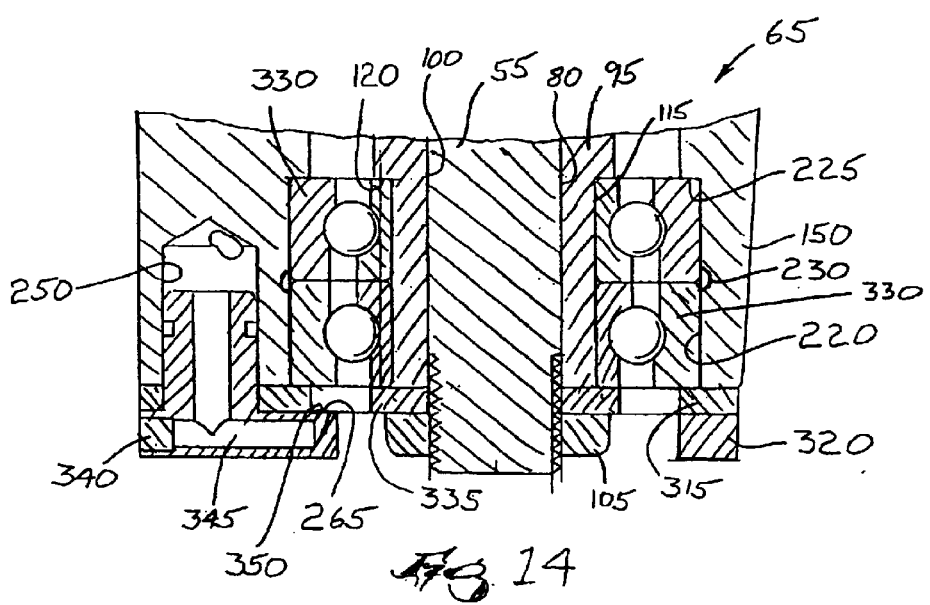
FIG. 14 is an enlarged sectional view of the second bearing of the housing of FIG. 6.
Figure 15:
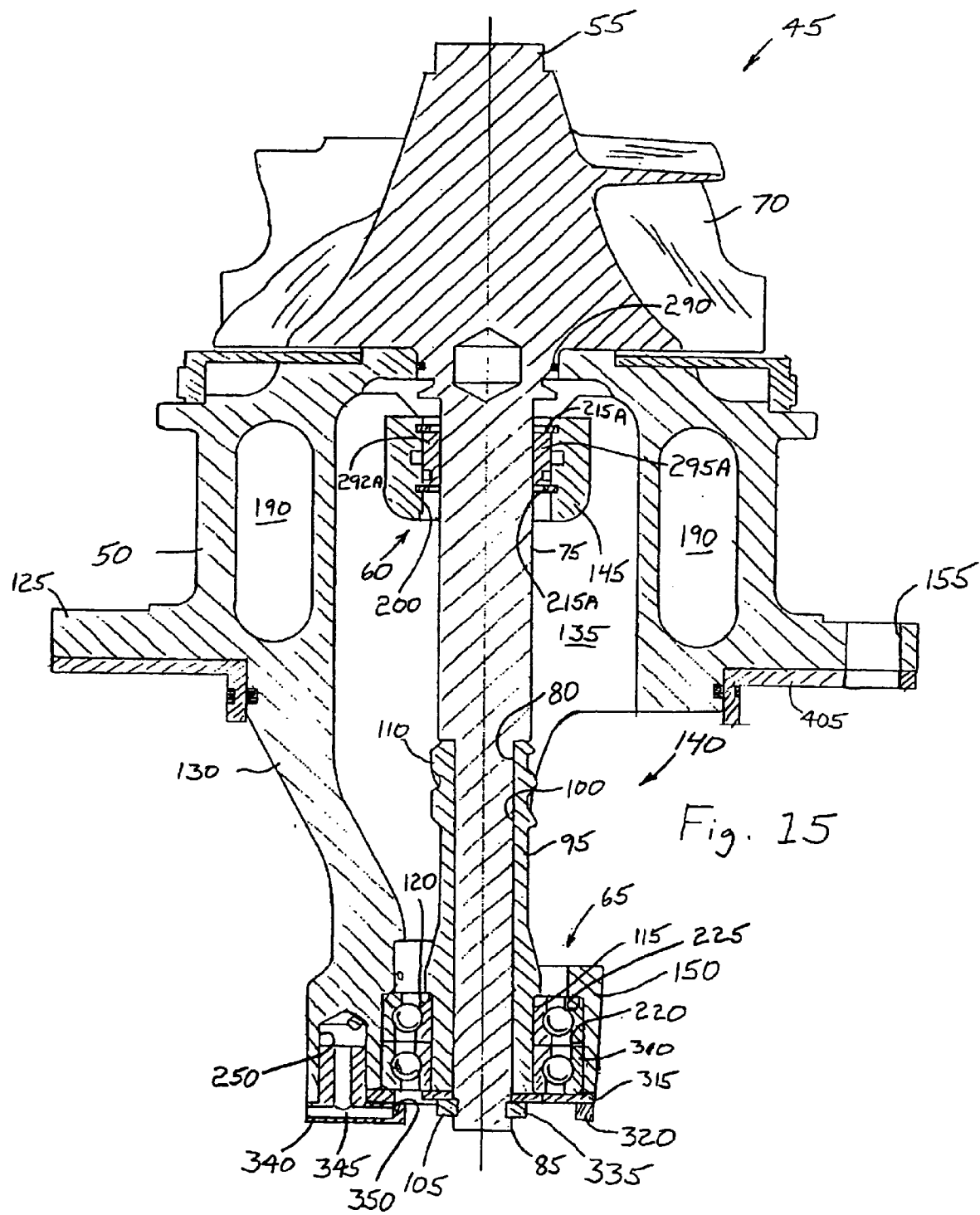
FIG. 15 is a cross-sectional view of the power turbine cartridge of FIG. 2.

As illustrated in FIG. 14, the duplex bearing 310 includes two angular contact ball bearings 330 oriented to allow the duplex bearing 310 to support thrust loading in either axial direction along the turbine rotor 55. The outside diameter of the duplex bearing 310 fits snuggly within the cylindrical bore 220 of the housing 50. The cylindrical bore 220 is positioned to align the duplex bearing 310 and the journal bearing 292 along a common axis. The inside diameter of the duplex bearing 310 receives the bearing portion 115 of the sleeve 95. The shoulder 120 of the sleeve 95 engages the top of the inner race of the bearing 310, while a washer 335 is forced against the bottom of the inner race by the nut 105. This arrangement allows the second bearing 310 to carry both rotational (radial) and thrust (axial) loads.

The spring member 315 is a plate that contacts the outer race of the duplex bearing 310 and biases it toward the shoulder 225 of the housing 50, thus positively fixing the axial position of the duplex bearing 310. The spring 315 allows for a small amount of axial movement of the turbine rotor 55.

The retainer 320 attaches to the housing 50 and holds the duplex bearing 310 in place. The retainer 320 also includes an oil block 340 that directs oil toward the lower portion of the duplex bearing 310. Oil within the lower reservoir 250 enters the oil block 340 that is attached to the second bearing retainer 320 or formed as part of the retainer 320. The oil block 340 includes a passage 345 and jet 265 that is aligned to spray oil on the lower surface of the second bearing assembly 65.

The oil shield assembly 325 includes a left shield 355, a right shield 360, and a shield mount 365. The shield mount 365 attaches to the housing and provides two threaded studs 370 each positioned to receive one of the left and right shields 355, 360. As is shown in FIG. 2, each shield 355, 360 is a substantially semicircular piece that rests in close proximity to the turbine rotor 55 and the housing 50. The two shield halves 355, 360 cooperate to provide a barrier that substantially prevents used oil from draining into the duplex bearing 310. Each shield 355, 360 includes a bore that fits over one of the studs 370. A nut threads onto the stud 370 to retain the shield 355, 360 in the desired position.

Figure 16:
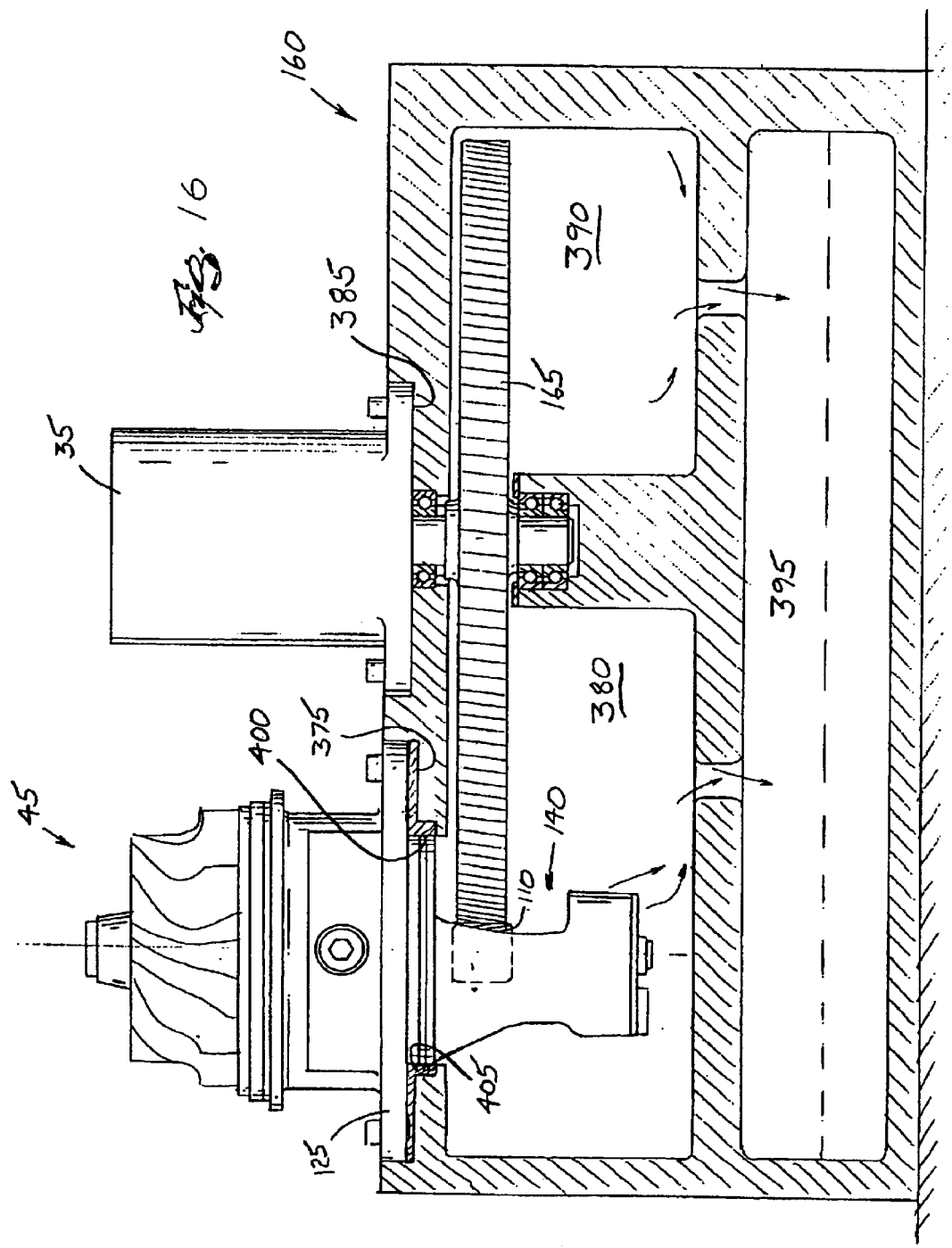
FIG. 16 is a partial cross-sectional view of a speed-reducing cartridge embodying the invention.

Turning to FIG. 16, the power turbine cartridge 45 is shown mounted to the speed-reducing cartridge 160 and coupled to the generator 35. It should be noted that FIG. 16 illustrates one possible configuration of a speed-reducing cartridge. For example, another construction inverts the generator 35 relative to the power turbine cartridge 45. In still other constructions, more than one device is driven by the power turbine cartridge 45 and supported by the speed-reducing cartridge 160. In yet another construction, the power turbine cartridge 45 and the driven component rotate on axes that are not parallel to one another. This can be especially useful when the power turbine cartridge 45 drives a pump or other device that requires more space between it and the power turbine cartridge 45.

The speed-reducing cartridge 160 illustrated in FIG. 16 includes a power turbine flange mount 375, a power turbine sump 380, a generator flange mount 385, a generator sump 390, and an oil sump 395. The oil sump 395 is a cavity disposed at the lowest level of the speed-reducing cartridge 160. Paths provided in the speed-reducing cartridge 160 direct lubricating oil to the sump 395 where it is gathered and recycled. In other constructions, the oil drains directly into an oil tank rather than into a sump as illustrated in FIG. 16.

The generator flange mount 385 provides a surface to which the generator 35 can be attached. The speed-reducing cartridge 160 of FIG. 16 provides bearing supports for the generator 35. A shaft extends out of the generator cartridge and supports the driven gear 165. In other constructions, the generator is a self-contained cartridge much like the power turbine cartridge 45 and requires no additional supports beyond the generator flange mount 385.

The position of the generator flange mount 385 is precisely located a distance from the power turbine flange mount 375. The distance is approximately equal to the sum of the radii of the drive gear 110 and the driven gear 165. The size of the drive gear 110 is fixed for the power turbine cartridge 45. The size of the driven gear 165 is calculated in a known way to assure rotation of the generator 35 at the proper speed. For example, a 2" diameter drive gear 110 on a power turbine cartridge 45 that rotates at 25,000 RPM would have to engage a 13.9" diameter driven gear 165 to drive a generator 35 at 3600 RPM.

The power turbine flange mount 375 is similar to the generator flange mount 385. The power turbine flange mount 375 provides a flat surface to which the power turbine cartridge 45 may attach. In addition, the power turbine flange mount includes a central bore sized to engage the power turbine cartridge 45. The central bore 400 assures that the power turbine cartridge 45 is properly positioned and aligned.

The power turbine cartridge 45 extends into the turbine sump 380. The sump 380 is a cavity that collects the lubricating oil that drains from the power turbine cartridge 45 and directs it toward the oil sump 395. Likewise, the driven gear 165 extends into the generator sump 390 which collects any lubricating oil that may drip from the driven gear 165 and directs it toward the oil sump 395.

Figure 17:
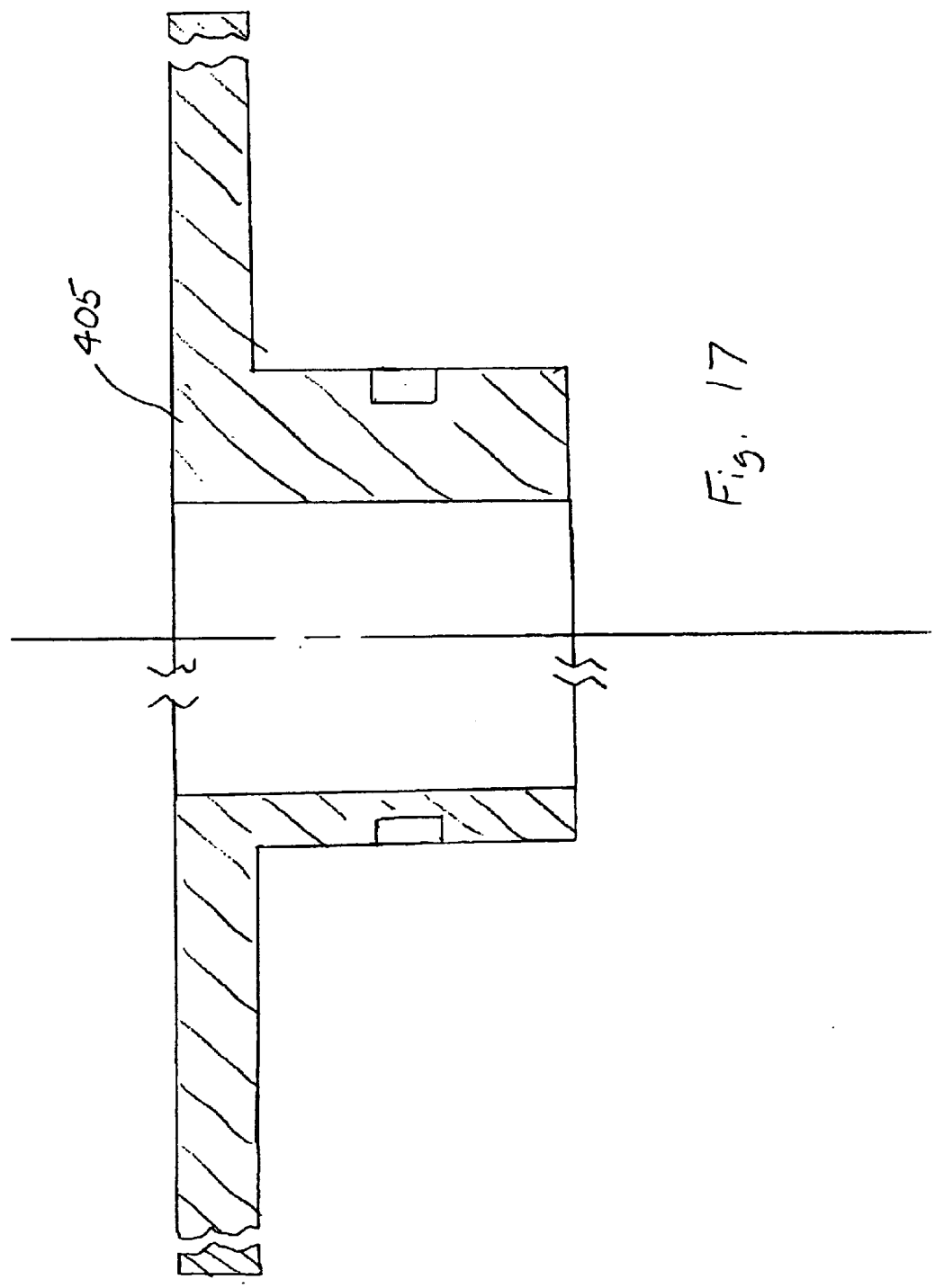
FIG. 17 is a sectional view of the eccentric ring of FIG. 16.

Due to the high-speed rotation of the turbine rotor 55 and the need for dynamic stability, it is necessary to precisely control the backlash between the drive gear 110 and the driven gear 165. To do this, the power turbine cartridge 45 is fitted with an eccentric ring 405 (illustrated in FIGS. 15–17) that is sized to engage the speed-reducing cartridge central bore 400. Rotation of the ring 405 about the power turbine cartridge 45 shifts the axis of rotation toward or away from the axis of rotation of the generator 35. The ring 405 has a circular inside diameter sized to tightly engage the power turbine cartridge 45, best illustrated in FIG. 15 and a circular outside diameter sized to engage the central bore 400 of the speed-reducing cartridge 160 as shown in FIG. 16. However, as is shown in FIG. 17 the inside and outside diameters are not concentric. Instead, the diameters are shifted relative to one another to produce the eccentric ring 405. The ring 405 enables the precise setting of the desired backlash. It should be noted that FIGS. 15 and 17 greatly exaggerate the eccentricity of the ring for illustrative purposes. In reality the eccentricity allows for adjustments up to about 0.030 inches, with larger adjustments possible with other rings.

While oil has been described herein as the lubricating fluid, a person having ordinary skill in the art will realize that other fluids can be used as lubricants. Therefore, the invention should not be limited to the use of oil alone.

Although the invention has been described in detail with reference to certain preferred embodiments, variations and modifications exist within the scope and spirit of the invention as described and defined in the following claims.

What is claimed is:

1. A power turbine assembly comprising:
   a turbine rotor;
   a plurality of turbine blades mounted to said rotor and adapted to rotate said rotor in response to a flow of hot gas over said blades;
   a support structure having a journal bearing and at least one other bearing supporting said rotor for rotation, said journal bearing having a proximal end and a distal end with respect to said turbine blades; and
   a supply of lubricant communicating with said journal bearing to provide lubricant between said rotor and an inner surface of said journal bearing, said lubricant damping rotational frequencies of said rotor and creating a temperature gradient from greater than about 1000° F. at said blades to less than about 350° F. at said distal end;
   wherein the at least one other bearing is a single duplex bearing, the journal bearing and duplex bearing providing the only support for the turbine rotor.

2. A power turbine assembly comprising:
   a turbine rotor;
   a plurality of turbine blades mounted to said rotor and adapted to rotate said rotor in response to a flow of hot gas over said blades;
   a support structure having a journal bearing and at least one other bearing supporting said rotor for rotation, said journal bearing having a proximal end and a distal end with respect to said turbine blades; and
   a supply of lubricant communicating with said journal bearing to provide lubricant between said rotor and an inner surface of said journal bearing, said lubricant damping rotational frequencies of said rotor and creating a temperature gradient from greater than about 1000° F. at said blades to less than about 350° F. at said distal end;
   wherein the turbine rotor is supported such that its first bending mode frequency is greater than the operating frequency of the turbine rotor.

3. The power turbine assembly of claim 2, wherein the journal bearing is a tilting-pad journal bearing and wherein the at least one other bearing comprises only non-journal-type bearings.

4. The power turbine assembly of claim 2, wherein the turbine rotor rotates at a speed above about 25,000 RPM.

5. The power turbine assembly of claim 2, further comprising a sleeve connected to the turbine rotor, the sleeve including a drive gear adapted to engage a driven gear.

6. The power turbine assembly of claim 5, wherein the drive gear is at least an AGMA class 12 gear.

7. The power turbine assembly of claim 5, wherein the sleeve is press-fit onto the turbine rotor.

8. The power turbine assembly of claim 5, further comprising a nut threaded onto the rotor adjacent a second end of the sleeve and retaining the sleeve.

9. A power turbine assembly comprising:
a turbine rotor;
a plurality of turbine blades mounted to said rotor and adapted to rotate said rotor in response to a flow of hot gas over said blades;
a support structure having a journal bearing and at least one other bearing supporting said rotor for rotation, said journal bearing having a proximal end and a distal end with respect to said turbine blades;
a supply of lubricant communicating with said journal bearing to provide lubricant between said rotor and an inner surface of said journal bearing, said lubricant damping rotational frequencies of said rotor and creating a temperature gradient from greater than about 1000° F. at said blades to less than about 350° F. at said distal end;
a retainer supporting the second bearing against thrust load and further providing a lubricant flow path and a lubricant outlet jet adjacent the lower portion of the second bearing; and
a spring member cooperating with the retainer to apply a predictable thrust preload to the second bearing.

10. A power turbine assembly comprising:
a high-speed turbine rotor having a turbine end;
a plurality of turbine blades mounted to the turbine end of the rotor and adapted to rotate said rotor in response to a flow of hot gas over said blades;
a sleeve connected to the rotor;
a journal bearing supporting the turbine end of the rotor; and
a supply of lubricant communicating with the journal bearing to provide lubricant between the rotor and the journal bearing, the lubricant and journal bearing cooperating to substantially dampen the vibration of the turbine rotor;
wherein the sleeve is press-fit onto the turbine rotor.

11. The power turbine assembly of claim 10, further comprising a second bearing supporting a second end opposite the turbine end of the turbine rotor.

12. The power turbine assembly of claim 11, wherein the second bearing is not a journal bearing and the second bearing supports the thrust load of the turbine rotor.

13. The power turbine assembly of claim 10, wherein the turbine rotor rotates at a speed above about 25,000 RPM.

14. The power turbine assembly of claim 10, wherein the rotor and sleeve together define a composite shaft having a stiffness greater than that of the rotor alone such that the composite shaft has a higher first bending mode frequency than the operating frequency of the rotor.

15. The power turbine assembly of claim 10, wherein the sleeve further includes a drive gear adapted to engage a driven gear.

16. The power turbine assembly of claim 15, wherein the drive gear is at least an AGMA class 12 gear.

17. The power turbine assembly of claim 10, further comprising a nut threaded onto the rotor adjacent the sleeve, the nut being tightened to retain the sleeve.

18. The power turbine assembly of claim 11, further comprising a retainer supporting the second bearing against thrust load and further providing a lubricant flow path and a lubricant outlet jet adjacent a lower portion of the second bearing.

19. The power turbine assembly of claim 18, further comprising a spring member cooperating with the retainer to apply a predictable thrust preload to the second bearing.

20. A structure for supporting a combustion turbine rotor for rotation above about 25,000 RPM, and to support the rotor for thrust, the structure comprising:
a housing defining a first support, a second support, and a lubrication flow path, the lubrication flow path receiving a flow of lubricant from an inlet and distributing the flow of lubricant to the first and second supports;
a journal bearing connected to the first support to support a first end of the turbine rotor for rotation; and
a second bearing connected to the second support to support a second end of the turbine rotor for rotation and to support the thrust load of the rotor.

21. The structure for supporting a combustion turbine rotor of claim 20, wherein the second bearing is a non-journal type bearing.

22. The structure for supporting a combustion turbine rotor of claim 20, wherein the journal bearing is a tilting-pad journal bearing and the second bearing is a duplex ball bearing.

23. The structure for supporting a combustion turbine rotor of claim 20, further comprising a retainer supporting the second bearing against thrust load and further providing a lubricant flow path and a lubricant outlet jet adjacent the lower portion of the second bearing.

24. The structure for supporting a combustion turbine rotor of claim 23, further comprising a spring member cooperating with the retainer to apply a predictable thrust preload to the second bearing.

25. The structure for supporting a combustion turbine rotor of claim 20, wherein the housing is formed from an integrally cast single piece.

26. The structure for supporting a combustion turbine rotor of claim 20, wherein the lubricant inlet further includes a first inlet supplying lubricant flow to the journal bearing and a second inlet providing lubricant flow to the drive gear and the second bearing.

27. The structure for supporting a combustion turbine rotor of claim 20, wherein the second bearing is a duplex ball bearing.

28. The structure for supporting a combustion turbine rotor of claim 20, further comprising a sleeve including a drive gear, the sleeve connected to the turbine rotor, wherein the drive gear is at least an AGMA class 12 gear.

29. The structure for supporting a combustion turbine rotor of claim 20, wherein the housing defines a water jacket having an inlet and an outlet, and wherein a coolant flow enters the water jacket through the inlet, flows through the water jacket and out the outlet to provide cooling to the housing.

30. The structure for supporting a combustion turbine rotor of claim 20, wherein the journal bearing separates the hot turbine components from cool lubricated components.

31. The structure for supporting a combustion turbine rotor of claim 20, further comprising a sleeve including a drive gear, the sleeve connected to the turbine rotor, wherein the sleeve is press-fit onto the turbine rotor such that the rotor and sleeve together define a composite shaft having a stiffness greater than that of the rotor alone such that the composite shaft has a higher first bending mode frequency than the operating frequency of the rotor.

32. The structure for supporting a combustion turbine rotor of claim 31, further comprising a nut threaded onto the rotor adjacent the sleeve, the nut being tightened to retain the sleeve.

33. The structure for supporting a combustion turbine rotor of claim 20, wherein the housing includes a plurality of lubricant jets, each jet aimed at one of the journal bearing, the drive gear, and the second bearing, the jets receiving a flow of lubricant and discharging it toward the aforementioned components.

34. A speed reducing cartridge for interfacing between a high-speed rotating turbine rotor and a lower speed rotating element, the cartridge comprising:

a power turbine cartridge including a journal bearing and a second bearing axially aligned with the journal bearing, the bearings supporting the turbine rotor for rotation about a first axis, the power turbine cartridge supported by the speed reducing cartridge;

a drive gear connected to the turbine rotor;

a driven gear connected to the lower speed rotating element;

a driven component housing supporting the lower speed rotating element for rotation about a second axis, the driven component housing supported by the speed reducing cartridge such that the drive gear and driven gear engage one another with a backlash; and an adjusting assembly interconnecting the power turbine cartridge and the speed reducing cartridge, the adjusting assembly movable to adjust the backlash between the drive gear and the driven gear.

35. The speed reducing cartridge of claim 34, wherein the adjusting assembly includes an eccentric ring.

36. The speed reducing cartridge of claim 34, wherein the second bearing is a non-journal type bearing.

37. The speed reducing cartridge of claim 34, wherein the journal bearing is a tilting-pad journal bearing and the second bearing is a duplex ball bearing.

38. The speed reducing cartridge of claim 34, further comprising a retainer supporting the second bearing against thrust load and further providing a lubricant flow path and a lubricant outlet jet adjacent the lower portion of the second bearing.

39. The speed reducing cartridge of claim 38, further comprising a spring member cooperating with the retainer to apply a predictable thrust preload to the second bearing.

40. The speed reducing cartridge of claim 34, wherein the housing is formed from an integrally cast single piece.

41. The speed reducing cartridge of claim 34, wherein the power turbine cartridge further comprises a first inlet supplying lubricant flow to the journal bearing and a second inlet providing lubricant flow to the drive gear and the second bearing.

42. The speed reducing cartridge of claim 34, wherein the second bearing is a duplex ball bearing.

43. The speed reducing cartridge of claim 34, wherein the drive gear is at least an AGMA class 12 gear.

44. The speed reducing cartridge of claim 34, wherein the housing defines a water jacket having an inlet and an outlet, and wherein a coolant flow enters the water jacket through the inlet, flows through the water jacket and out the outlet to provide cooling to the housing.

45. The speed reducing cartridge of claim 34, wherein the first axis is parallel to the second axis.

46. The speed reducing cartridge of claim 34, further comprising a sleeve press-fit onto the turbine rotor such that the rotor and sleeve together define a composite shaft having a stiffness greater than that of the rotor alone such that the composite shaft has a higher first bending mode frequency than the operating frequency of the rotor.

47. The speed reducing cartridge of claim 46, further comprising a nut threaded onto the rotor adjacent the sleeve, the nut being tightened to retain the sleeve.

48. The speed reducing cartridge of claim 34, wherein the housing includes a plurality of lubricant jets, each jet aimed at one of the journal bearing, the drive gear, and the second bearing, the jets receiving a flow of lubricant and discharging it toward the aforementioned components.

49. A method of controlling heat flow between a high-temperature region and a precision aligned region of a high-speed rotating shaft, the method comprising:

providing a housing including a journal bearing support;

supporting the high-speed shaft for rotation using the journal bearing such that the high-temperature region is adjacent the journal bearing; and introducing a flow of lubricant to the journal bearing to provide lubrication between the bearing and the shaft and to provide cooling to the bearing and the shaft;

maintaining the precision aligned region of the high-speed rotating shaft below 350° F.

50. The method of claim 49, wherein the journal bearing defines a proximal end and a distal end relative to the high-temperature region and wherein the high-temperature region operates at about 1000° F. or higher while the distal end is maintained at about 350° F. or lower.

51. The method of claim 49, wherein the housing further defines a water jacket therein and the method further includes the act of passing a flow of fluid through the water jacket to cool the housing.

52. A method of supporting and aligning a high-speed turbine rotor having a drive gear with a lower speed rotor having a driven gear such that the high-speed turbine rotor is able to drive the lower speed rotor, the method comprising the acts of:

providing a speed reducing cartridge;

supporting the high-speed turbine rotor within a housing for rotation about a first axis, the housing including a journal bearing and a non-journal bearing supporting the turbine rotor for rotation;

supporting the lower speed rotor within the speed reducing cartridge such that the lower speed rotor is rotatable about a second axis;

interconnecting the housing and the speed reducing cartridge with-an adjusting member such that the first axis is offset a distance from the second axis;

engaging the drive gear and the driven gear such that a backlash between the gears is present; and adjusting the adjusting member to change the distance between the first axis and the second axis to achieve a desired backlash.

53. The method of claim 52, wherein the first and second axes are arranged parallel to one another.

* * * * *